Jan. 8, 1935.  J. GOUGH  1,987,103
LEAF SEPARATOR AND FEEDER
Filed Oct. 29, 1931
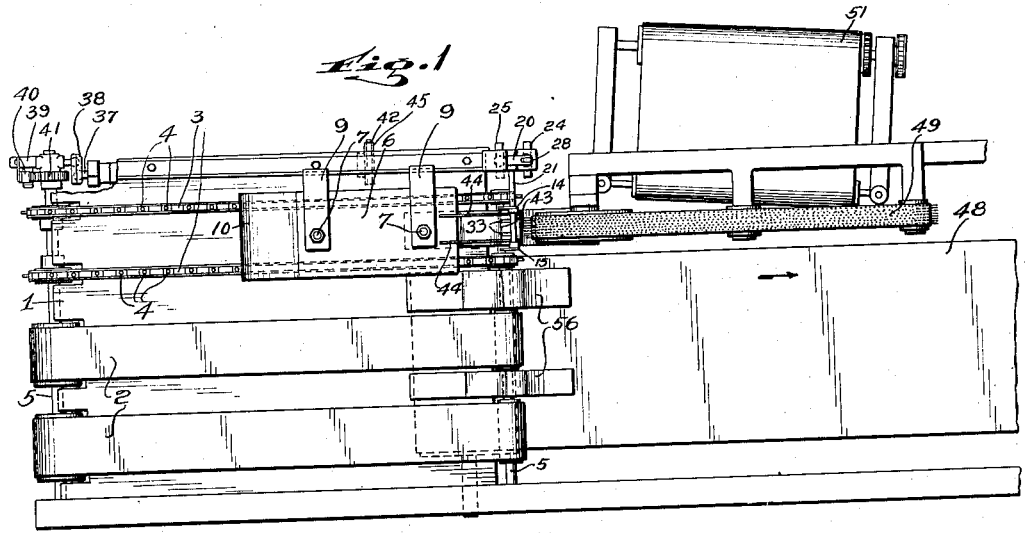
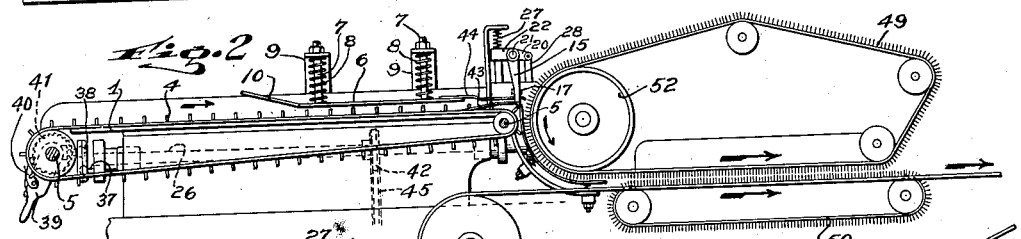
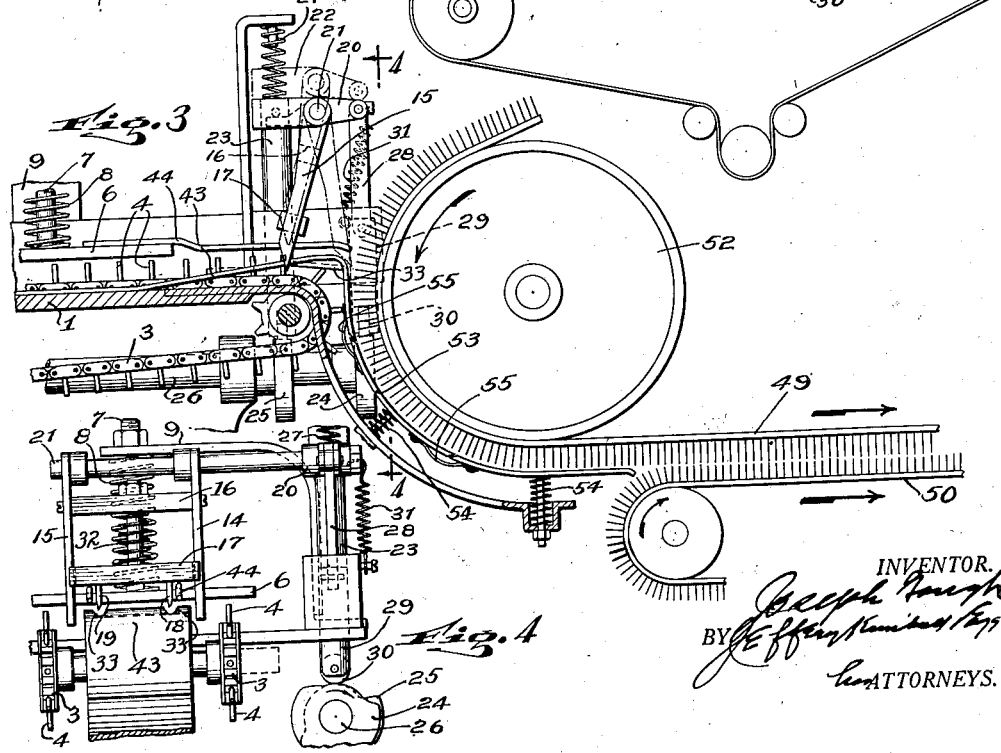

Patented Jan. 8, 1935

1,987,103

UNITED STATES PATENT OFFICE 1,987,103

LEAF SEPARATOR AND FEEDER

Joseph Gough, Newark, N. J., assignor to Gough Stemming Machine Corporation, New York, N. Y., a corporation of New Jersey Application October 29, 1931, Serial No. 571,818

17 Claims. (Cl. 131—57)

My invention relates to breaking up bundles of dried leaves, especially bundles of tobacco leaves, and also to feeding such bundled leaves to stemmers or other leaf-processing machines or mechanisms which require that the leaves be fed to them more or less separated from each other.

In some tobacco fields, it is customary to gather the green leaves together into bundles, with their stems twisted or tied together, and to dry them in this condition. The object of my invention is to provide an improved mechanism for more or less separating the leaves of such bundles, and mechanism which can be used as feeders for stemmers and other leaf-processing machines.

My method of operating consists, speaking broadly, of breaking the twine or other wrappings of stems of the bundles, then crudely breaking the bundles open, or separating them into distinct parts,—by hand for example—and in this condition passing the leaf masses to a finger or fingers which rapidly and repeatedly rake individual leaf masses as it were (more or less at right angles to the mass), as for example by repeatedly piercing the individual leaf masses and at each stroke thrusting an integral part of the mass away more or less transversely of itself and more or less at right angles to the body or remainder of the leaf mass. The raking finger or fingers may throw the separated leaves into a pile, or pass them to a conveyor; in the latter case the conveyor mechanism will serve to maintain some separation between the individual leaves (or small group of leaves) and deliver them separated to the processing machine or mechanism. This conveyor mechanism may be the conveyor of a processing machine.

In the accompanying drawing, Fig. 1 is a plan view of a separating and feeding mechanism of my invention arranged for feeding a stemming machine. Fig. 2 is an elevation of the same mechanism. Fig. 3 is a larger scale elevation, partly in section, of a part of the same machine adjacent the point where the leaf masses are divided up. Fig. 4 is an elevation substantially on the line IV—IV of Fig. 3.

In the machine illustrated, a horizontal table 1 is overlaid with a belt conveyer or plurality of belt conveyors 2 and 3 for carrying the broken bundles to the separating station. The broken bundles are laid across these belts, with the stem ends of the leaves extending across the belts 3 and the blades on the belts 2. At 2, the conveyor may consist of a smooth rubber, leather or canvas belt or belts, but preferably the part at 3 is toothed in some manner, so as to positively hold and carry the leaves along; conveniently 3 can consist of a pair of sprocket chains provided with projecting pin teeth 4 on the links. The various conveyor belts (if more than one is employed) can be supported by pulleys on common shafts 5. To press and hold the leaf stems between the conveyor teeth 4, a plate 6 may be provided, carried on rods 7 surrounded by springs 8 to resiliently press the plate toward the tops of the pins or the teeth 4, these supporting rods being carried on brackets 9 arising from the bed of the machine. This presser plate 6 extends only part way toward the (lefthand) receiving end of the conveyor belts so as to leave room for the placement of the leaf masses on the conveyor belts by the operator, and the entrance end of the presser plate may be turned upwardly as indicated at 10 to assure the leaf masses passing underneath it.

Adjacent the discharge end of the conveyor belts is provided the finger device or rake which acts to divide up the leaf masses brought forward by the conveyor or conveyors just described. The device or rake here shown is representative of suitable devices for the purpose, and also is illustrative of its preferred form. Primarily, it consists of finger members 14 and 15 pointed at their lower ends where they work on the leaf masses, and arranged and disposed to work on the leaf masses adjacent the toothed belts 3 particularly, i. e., adjacent the stem ends of the leaves whereat the leaves are attached together in bundling. In the present instance, these fingers are arranged to be thrust down into or against the individual leaf masses as the latter are brought forward by the conveyor belts, and the raking action is by motion in the same direction as that in which the conveyors carry the leaves (to the right, in the drawing). The specific motion of these fingers is substantially as represented by the three positions of the finger 15 shown in Fig. 3; that is to say, the fingers are first thrust downwardly into a leaf mass, then moved to the right (to pull an integral part of the leaf mass from the remainder), and then are returned upward and backward to their starting positions. Obviously the movement does not need to be in a triangular path like that illustrated however. Advantageously, supplemental fingers such as 18 and 19 for example, are provided between the fingers 14 and 15. The fingers 14 and 15 operating outside the leaf-mass-support 43 later mentioned again, may be, and preferably are, thrust positively against or into the leaf masses; the supplemental or intermediate fingers 18 and 19 working rather opposite this plate however, are preferably supported resiliently. To the latter end, the supplemental or intermediate fingers may be mounted on a crossbar 17 slidable on the fingers 14 and 15 and which is pressed outwardly by spring 32 interposed between this bar 17 and a bar 16 fastened to 14 and 15. The leaf-mass-support 43 may be slotted or indented at 33, below the fingers 18 and 19, to permit the latter to pass more or less through the support. In the present instance, the movement of the finger device is secured by fixing the frame formed by the fingers 14 and 15 and the associated cross-bar 16 (see Fig. 4) on a rock shaft 21 to which a bracket 20 is fixed, and which shaft is mounted on bearings in the head 22 of a vertically reciprocating rod 23, together with cams 24 and 25 on the driven shaft 26. The carrying rod 23 is mounted in a suitable bracket extending from the machine bed, and is provided with a spring 27 holding the lower end of the rod (or a roller on the lower end of the rod) in constant engagement with the cam 25. The bracket 20 is also linked at 28 to a guided vertical plunger 29 for co-action with the cam 24 (directly or through a cam roller as illustrated at 30 in Fig. 4). A spring 31 serves to hold the cam follower in engagement with cam 24. The shapes of the cams 24 and 25 are indicated in Fig. 4. The parts of these two cams not shown in this figure are circular. It is obvious of course that the cams 24 and 25, in reciprocating carrying post 23 and plunger 29, will cause the finger device to move through the path previously pointed out.

Preferably the conveyor device 2—3 is advanced intermittently, step by step, and is advanced in such a timed relation with respect to the operation of the finger device, that the finger device is thrust downwardly from its highest to its lowest position (see Fig. 3) and is also thrust out to tear off a part of the leaf mass beneath it, at a time when the conveyor system 2—3 is at rest. To effect and maintain this timing the conveyor system may be driven by the same driven shaft 26 as drives the cams 24 and 25 and in order to secure the step by step motion this shaft may drive the conveyor system through a pawl and ratchet mechanism. This is the connection between the driven shaft 26 and the lefthand shaft 5 of the conveyor system; it will be observed that a crank 37 on shaft 26 actuates a link 38 connected to an arm 39 rocking on the rear end of the lefthand conveyor shaft 5, and carrying a pawl 40 spring-pressed toward a ratchet 41 fastened to this shaft. The driven shaft 26 may be driven by a sprocket and chain 42 and 45 for example, from any convenient power source. Usually I so adjust the throw of the pawl 40, that the conveyor belts make from two to four steps forward in advancing the distance between two of the pins or teeth 4; since the finger device 14—19 is arranged to move through one complete cycle for each step forward of the conveyor belts, obviously the fingers can rake a leaf mass between any two adjacent fingers 4 a corresponding number of times, and divide any such mass into a corresponding number of integral parts. This should not be taken to mean that each leaf mass is carefully laid entirely between two adjacent fingers or teeth 4; to the contrary, a broad leaf mass may extend across the space of a number of these pin teeth 4.

The table top 1 provides a surface against which the leaves or leaf stems may lie, intermediate the two belts 3. Adjacent the finger device however, this supporting surface is preferably inclined upwardly to a point nearly or quite at the tops of the pin teeth 4, and for this purpose I usually provide an inclined metal plate 43 at this place. This inclined surface not only tends to raise the leaves out of the path of the pin teeth 4, but also serves to hold the leaf masses well up within the range of the finger device in its raking action. The devices 44 are extensions of the holding or pressure plate 6, separated from each other to provide space for the fingers to pass down through them to engage the leaves.

As before indicated, the leaf separator thus described, may deliver the separated leaves into a conveyor, and the latter may be a part of the machine for processing the leaves. Both a preferred form of conveyor for the separated leaves, and the use of the leaf separator as a feeder for a stemming machine, are illustrated in the drawing. The nature of the leaf stemmer is not of primary importance to the present invention. The stemmer shown in the drawing consists essentially of a broad conveyor belt 48 to receive the blades of the leaves, a pair of card clothing belts 49 and 50 for receiving the butt ends of the stems between them, one or both the latter constituting the blade stripper and a pair of belts 51 to grab and pull the stems from the blades in passing; the card clothing belts 49 and 50 and the conveyor belt 48 run in the directions indicated by the arrows in Fig. 2. This type of stemmer is already known, and the foregoing description thereof will serve the present purposes.

The relation between the card clothing conveyor and the separator is shown in the drawing; in brief, the toothed conveyor 49 where it passes around its supporting pulley 52, is located adjacent and so close to the finger device 14—19, that the latter thrusts the separated leaves substantially into the teeth of this conveyor 49; a circular guide 53 will serve to press the butt ends of the leaves into the wires or teeth of this conveyor, and hold them therein until they reach the cooperating toothed conveyor 50 (see Fig. 3 particularly). As a matter of convenience, this guide 53 may be an extension of, and formed in part by, the plate 43 before mentioned, and as shown in the drawing; in order to provide appropriate flexibility, the guide 53 may be composed of sections, individually pressed toward the teeth of conveyor belt 49 by individual springs 54, and joined together by bowed spring links 55. Stationary curved guides 56 may be provided for supporting the blades of the leaves in passing from the belts 2 to the belt 48, the curves of these guides more or less corresponding with the curves of the guide 53 for the butt ends of the leaves. The conveyor belts 48, 49 and 50, receiving the separated leaves, are driven at such a speed as to keep the leaves separated more or less, and correspondingly a more or less seriatim delivery of the leaf stems into the stamming belts 51; whether the speed of the conveyor belts 48, 49 and 50 is just sufficient to maintain the separation given to the leaves by the operation of the finger device, 15—19, or whether their speed is greater or somewhat less than this, may be determined by the needs of the stemming belts 51.

In operation, bundles of leaves of the kind described are first crudely broken open by hand, as before mentioned, or more or less separated into distinct parts by hand, and, say by hand, placed on the conveyor belts 2 and 3, at the lefthand end of the latter as viewed in the present drawings; as before mentioned, the butt ends of the leaves are placed across the belts 3, and the blade ends on the belts 2. The advancements of these belts 2 and 3 carry these partly opened or broken bundles to the finger device 14—19, and intermediate each advancing step of these conveyor belts 2—3, the finger device 14—19 is thrust downwardly into the leaf mass immediately below it, and then quickly oscillated toward the right to tear away an integral part of the leaf mass, and thrust this part into or on to the teeth of the stemmer conveyor belt 49; the various pin teeth 4, and the coaction of the plate 43 and the extension members 44 of the presser plate 6, hold or tend to retain the remainder of each leaf mass as, say, one or two or three leaves are snatched off by the oscillation of the finger device. Repeated actions of the finger device, in cooperation with repeated step by step advancements of conveyor belts 2—3, thus result in the ultimate disintegration of each leaf mass into substantially its component elements. Of course, it will be understood that not every oscillation of the finger device will strip off a leaf from an oncoming leaf mass, and individual oscillations of the finger device may pull off two or three leaves, instead of a single one. Each unit of a single leaf, or group of a few numbers of leaves, is carried away by the continuously-moving card clothing belt 49 as the latter receives it, and without further attention are carried along, separated from each other, to the stemming station and there are stemmed by the action of the stemming belts 51 in cooperation with the card clothing belts 49 and 50.

It will be understood, of course, that my invention is not limited to the details of construction and operation above described and illustrated in the drawing, except as appears hereinafter in the claims.

What is claimed is,

1. In mechanism for separating bunched leaves, a rake, means to hold a portion of each leaf mass in a substantially stationary position under the rake, and means to thrust the rake into the same mass and rake a second portion from the mass while said means is holding the first mentioned portion in said substantially stationary position.

2. In mechanism for separating bunched leaves, a rake, means to hold portions of each leaf mass in substantially stationary position under the rake, and means to thrust the rake into the same mass repeatedly and each time rake a portion from the mass while said means is holding the remainder of the said mass in such substantially stationary position.

3. In mechanism for separating bunched leaves, a rake, a conveyor and holding means to carry leaf masses to the rake and hold a portion of each leaf mass in substantially stationary position under the rake, means to advance said conveyor means step by step, and means to rake the rake over the leaf masses in substantially the intervals during which said conveyor and holding means is at rest and holding said portions in such substantially stationary position.

4. The subject matter of claim 1, in combination with a stemming device having a blade stripper and means to grasp and pull the stems from the blades, said stemming device also including a conveyor to carry the leaves to said means to grasp the stems, said conveyor being located to receive the part separated from the remainder of the leaf mass by said rake, and means to move said conveyor at a speed sufficient to keep the said part separated from the remainder of the mass.

5. In mechanism for separating bunched leaves, the combination of a rake, means to present leaf masses to the rake successively and hold portions of each mass in substantially stationary position under the rake, means to rake the rake on said individual leaf masses repeatedly while said means is holding said portions in such substantially stationary positions, and means providing a surface or surfaces to support the stem ends of the leaf masses against the thrust of the fingers of the rake, said means being so located that said surface or surfaces lie between the fingers of the rake as said fingers are raked on a leaf mass supported by said surface or surfaces.

6. In mechanism for separating bunched leaves, a belt-type conveyor for the leaf masses, a plurality of rows of teeth thereon to receive the leaf masses transversely, means for advancing said conveyor step by step, a finger device adjacent the discharge end of the conveyor, and means for thrusting said finger device into the leaf masses, thence substantially in the direction of the movement of the conveyor, and thence upwardly and back to its starting position, said means moving said finger device in substantially the direction of movement of the conveyor during substantially each of the intervals when the conveyor is at rest.

7. The subject matter of claim 6, in combination with a second toothed conveyor for the separated leaves, said second toothed conveyor being located adjacent said finger device so that the latter thrusts the separated leaves substantially into the teeth of the latter conveyor.

8. In mechanism for separating bunched leaves, means providing a surface or surfaces for supporting the stem ends of the leaf masses against the thrust of the fingers hereinafter mentioned, a finger to engage the stem ends of the leaf masses at each side of said means, and mechanism operating said fingers to repeatedly thrust the ends of said fingers into each leaf mass substantially transversely of said surface or surfaces and past said surface or surfaces, and then move the finger ends substantially parallel to said surface or surfaces, in combination with other fingers to work on the leaf masses in substantially the same directions, said other fingers being located between the first mentioned fingers, and means resiliently mounting said other fingers.

9. In mechanism of the kind indicated, a conveyor for leaf masses, a table onto which said conveyor thrusts the leaf masses beyond the grasp of the conveyor, a device having finger means to thrust into the leaf masses by movement in a direction substantially directly toward the table top, and then to move in a direction at an angle to the first mentioned direction to carry said masses away from said conveyor and table, and means to drive said device at such a speed, relative to the speed of the conveyor, that said finger means acts a plurality of times on substantially each leaf mass to separate parts thereof from each other.

10. In mechanism of the kind indicated, a conveyor engaging the stem-ends of leaf masses, a table onto which said conveyor thrusts the stem-ends of the leaf masses, a device having finger means to thrust into the stem-ends of the leaf masses by movement in a direction substantially directly toward the table top, and then to move in a direction at an angle to the first mentioned direction to carry said masses away from said conveyor and table, and means to drive said device at such a speed, relative to the speed of said conveyor, that said finger means acts a plurality of times on the stem-ends of substantially each leaf mass to separate stems of each mass from each other.

11. The combination with the subject matter of claim 10, of a conveyor movable substantially parallel to the conveyor engaging the stem-ends of the leaf masses, to transport the blade portions of the leaf masses.

12. The combination of the subject matter of claim 10 and means to advance said conveyor intermittently step by step.

13. The subject matter of claim 10, characterized by the fact that said conveyor comprises a pair of conveying elements, substantially parallel to and spaced from each other, and said table rises between said conveying elements.

14. The subject matter of claim 10, characterized by the fact that said conveyor comprises a pair of intermittently-advancing conveying elements, substantially parallel to and spaced from each other, said table rises between said conveying elements, and said finger means operates at both sides of said table adjacent said conveying elements.

15. The subject matter of claim 10, characterized by the fact that said finger device includes a pair of projecting fingers and operating at the two sides of said table.

16. The combination with the subject matter of claim 10, of a receiving conveyor to receive the separated stems from said finger device, said receiving conveyor operating at a speed at least equal to the speed of said finger device.

17. The combination with the subject matter of claim 10, of a leaf stemming device including a blade-stripping device, said blade-stripping device being so located with respect to said finger device as to receive the separated stems therefrom.

JOSEPH GOUGH.

CERTIFICATE OF CORRECTION.

Patent No. 1,987,103. January 8, 1935.

JOSEPH GOUGH.

It is hereby certified that error appears in the printed specification of the above numbered patent requiring correction as follows: Page 4, second column, line 9, claim 15, strike out the word "and"; and that the said Letters Patent should be read with this correction therein that the same may conform to the record of the case in the Patent Office.

Signed and sealed this 26th day of February, A. D. 1935.

Leslie Frazer (Seal) Acting Commissioner of Patents.